(12) United States Patent
Takasawa

(10) Patent No.: US 10,725,571 B2
(45) Date of Patent: Jul. 28, 2020

(54) ELECTRONIC APPARATUS, CONTROL METHOD, AND STORAGE MEDIUM

(71) Applicant: CANON KABUSHIKI KAISHA, Tokyo (JP)

(72) Inventor: Kengo Takasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 16/012,082

(22) Filed: Jun. 19, 2018

(65) Prior Publication Data

US 2019/0004652 A1 Jan. 3, 2019

(30) Foreign Application Priority Data

Jun. 29, 2017 (JP) .................. 2017-128042

(51) Int. Cl.
*G06F 3/048* (2013.01)
*G06F 3/041* (2006.01)
*G06F 3/044* (2006.01)
*G06F 3/0488* (2013.01)
*G06F 3/0484* (2013.01)

(52) U.S. Cl.
CPC ........... *G06F 3/0412* (2013.01); *G06F 3/044* (2013.01); *G06F 3/04847* (2013.01); *G06F 3/04886* (2013.01); *G06F 2203/04105* (2013.01)

(58) Field of Classification Search
CPC ...... G06F 3/048; G06F 3/0488; G06F 3/0412; G06F 3/044; G06F 3/01; G06F 3/0354; G06F 3/0481; G06F 3/0482; G06F 3/041; G06F 3/033; G06F 3/045; G06F 3/16; G06F 3/0416; G06F 3/0487; G06F 3/0484; G06F 3/0483; G06F 3/016; G06F 17/21; G06F 17/227; G09G 5/00; G09G 5/08; H04M 1/00; H01H 13/76; G08B 6/00; H04N 21/4312; H04N 21/4821; H04N 21/42224; H04L 12/58

See application file for complete search history.

(56) References Cited

U.S. PATENT DOCUMENTS

2012/0147052 A1\* 6/2012 Homma .............. G06F 3/04886
345/660
2013/0127765 A1\* 5/2013 Behdasht ................ G06F 3/041
345/173

(Continued)

FOREIGN PATENT DOCUMENTS

JP 03-288221 12/1991

*Primary Examiner* — Chanh D Nguyen
*Assistant Examiner* — Nguyen H Truong
(74) *Attorney, Agent, or Firm* — Canon U.S.A., Inc. IP Division

(57) ABSTRACT

In an electronic apparatus, a control unit performs control to continuously perform a predetermined function according to continuation of a touch operation on an operation surface, to decrease a speed or execution frequency of the predetermined function according to a pressing operation being detected with the touch operation on the operation surface kept continued, and not to increase the speed or execution frequency of the predetermined function for a predetermined period even when a state of the pressing operation being detected is changed to a state of the pressing operation not being detected with the touch operation on the operation surface kept continued.

18 Claims, 6 Drawing Sheets

(56) References Cited

U.S. PATENT DOCUMENTS

| | | | |
|---|---|---|---|
| 2013/0181932 A1* | 7/2013 | Shinozaki | G06F 3/016 |
| | | | 345/173 |
| 2014/0139471 A1* | 5/2014 | Matsuki | G06F 3/0485 |
| | | | 345/173 |
| 2016/0239202 A1* | 8/2016 | Lee | G06F 3/04883 |
| 2016/0259412 A1* | 9/2016 | Flint | G06F 3/0488 |
| 2019/0191208 A1* | 6/2019 | Coenen | H04N 21/42224 |

* cited by examiner

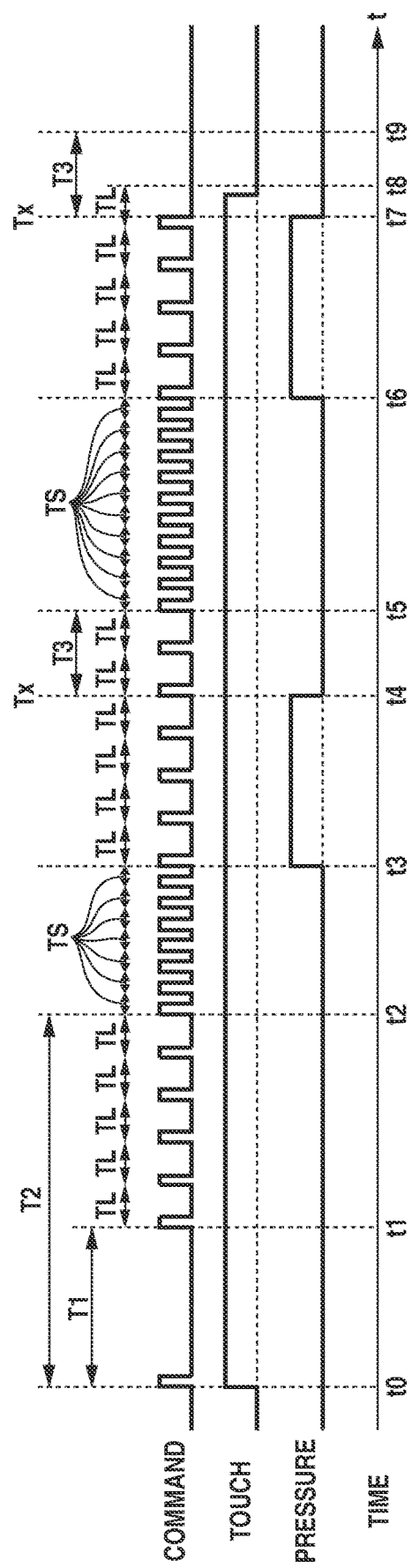

ELECTRONIC APPARATUS, CONTROL METHOD, AND STORAGE MEDIUM

BACKGROUND

Field of the Disclosure

Aspects of the present disclosure generally relate to electronics and, more particularly, to an electronic apparatus capable of detecting a touch operation and pressing force on an operation surface, a control method therefor, and a storage medium.

Description of the Related Art

An electronic apparatus is known which detects a touch performed on a touch panel and a pressing force generated by the touch and performs processing that is based on the detected touch and pressing force. Japanese Patent Application Laid-Open No. 3-288221 discusses an electronic apparatus capable of changing a key repeat interval based on information about the strength of pressing force obtained from a touch panel.

In a case where a predetermined function is continuously performed at a specific speed or execution frequency in association with the continuation of a touch operation, as in key repeat, if the speed or execution frequency of the function is high, a result aimed at can be quickly approached, but, on the other hand, an intended position or value may be erroneously passed over. Even in a case where a key repeat interval is changed based on information about the strength of pressing force, as in Japanese Patent Application Laid-Open No. 3-288221, if the key repeat interval is too short, a position or value aimed at by the user may be passed over.

It would be desirable to improve electronic technology to readily and more accurately obtain a result of execution of desired functions intended by users.

SUMMARY

Aspects of the present disclosure are generally directed to providing an electronic apparatus configured to be able to more quickly and accurately obtain a result of execution of a predetermined function intended by the user.

According to an aspect of the present disclosure, an electronic apparatus includes a touch detector configured to detect a touch operation performed on an operation surface, a pressing detector configured to detect a pressing operation performed on the operation surface, and a memory and at least one processor which function as a control unit configured to perform control to continuously perform a predetermined function according to continuation of the touch operation on the operation surface detected by the touch detector, to decrease a speed or execution frequency of the predetermined function according to the pressing operation being detected by the pressing detector with the touch operation on the operation surface kept continued, and not to increase the speed or execution frequency of the predetermined function for a predetermined period even when a state of the pressing operation being detected by the pressing detector is changed to a state of the pressing operation not being detected with the touch operation on the operation surface kept continued.

Further features of the present disclosure will become apparent from the following description of exemplary embodiments with reference to the attached drawings.

BRIEF DESCRIPTION OF THE DRAWINGS

FIG. 5 is a timing chart illustrating an example of issuance timing of key commands by key repeat in the time setting processing.

DESCRIPTION OF THE EMBODIMENTS

Exemplary embodiments of the present disclosure will be described in detail below with reference to the accompanying drawings.

It is to be noted that the following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiments.

Figure 1:
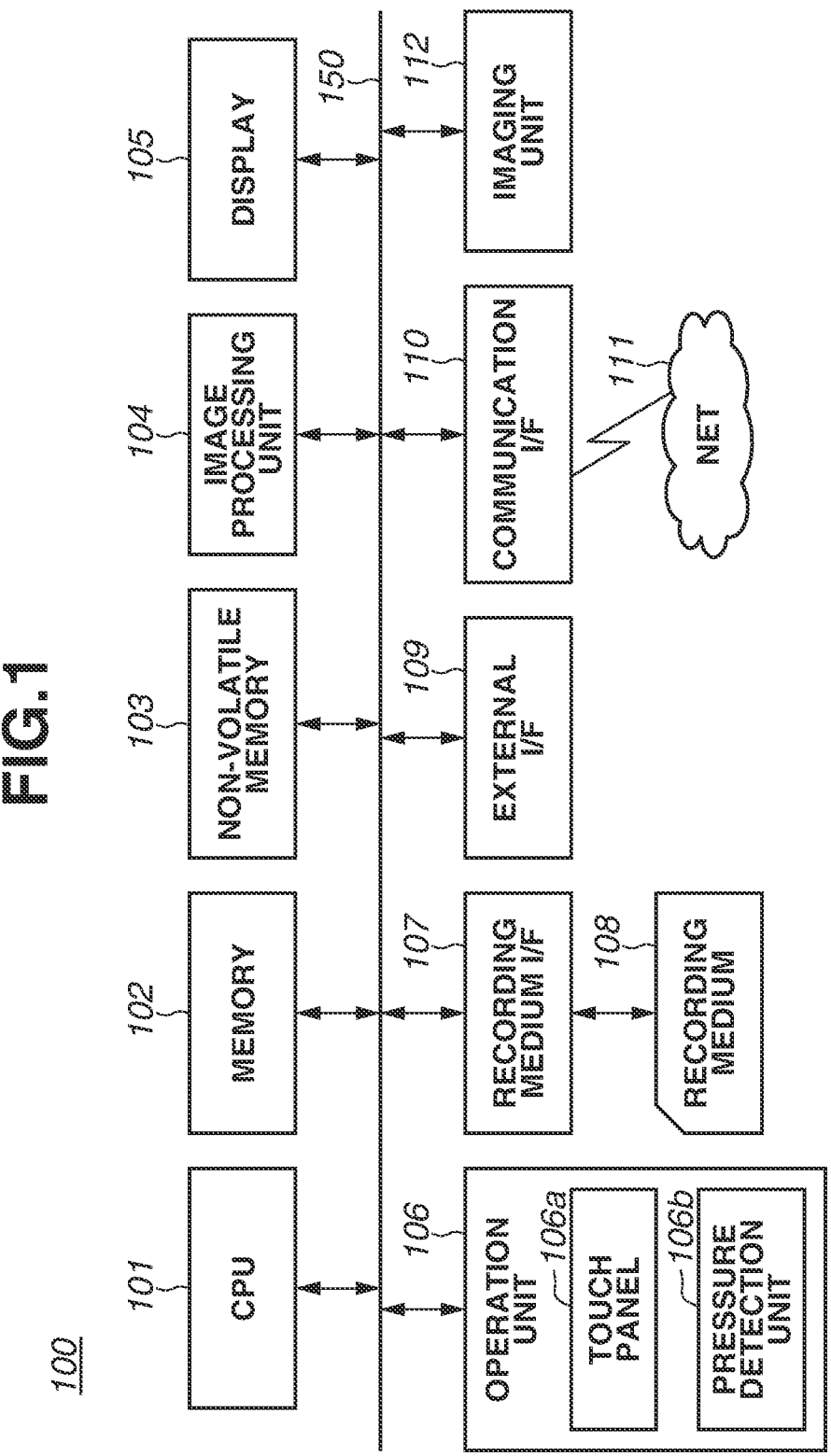
FIG. 1 is a schematic configuration block diagram of a digital camera.
Figure 2:
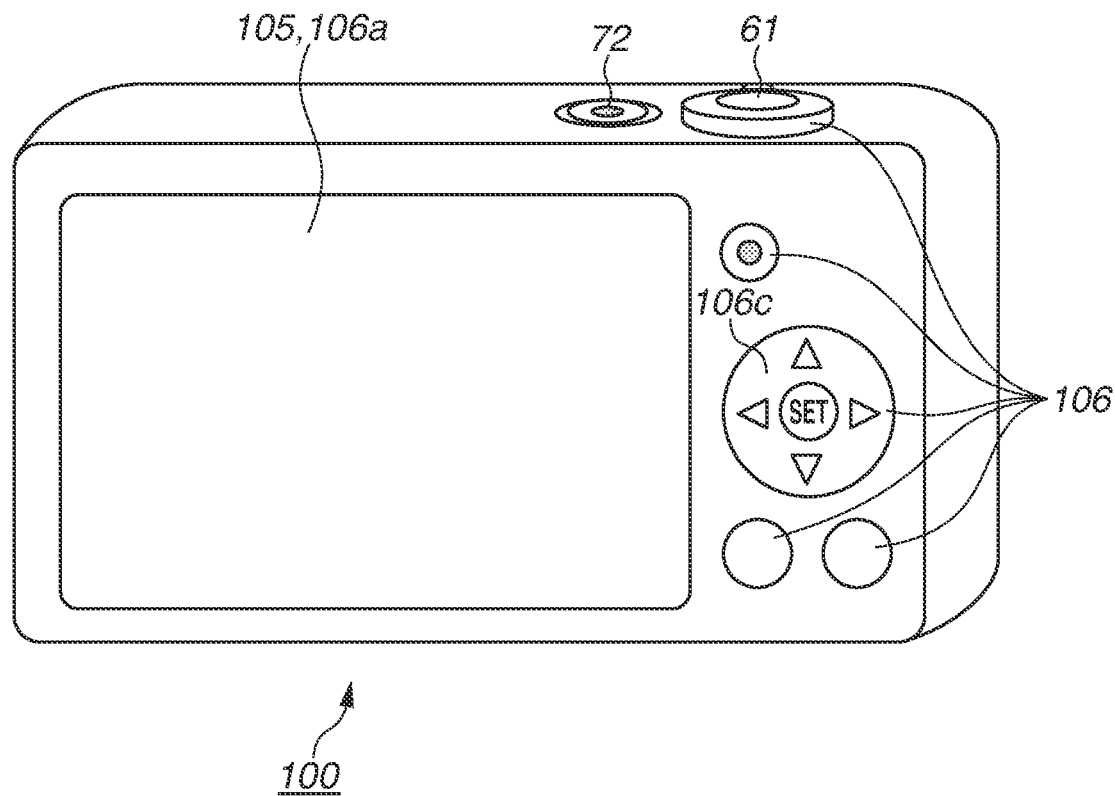
FIG. 2 is a back side appearance diagram of the digital camera.

FIG. 1 illustrates a schematic configuration block diagram of a digital camera 100 taken as an example of an electronic apparatus according to an exemplary embodiment of the present disclosure. FIG. 2 illustrates a back side appearance diagram of the digital camera 100.

Referring to FIG. 1, a central processing unit (CPU) 101, a memory 102, a non-volatile memory 103, an image processing unit 104, a display 105, an operation unit 106, a recording medium interface (I/F) 107, an external I/F 109, a communication I/F 110, and an imaging unit 112 are connected to an internal bus 150. Various units connected to the internal bus 150 are configured to be able to communicate data with each other via the internal bus 150.

The memory 102 includes, for example, a random access memory (RAM) (a volatile memory using semiconductor elements). The CPU 101, which may include one or more processors and one or more memories, and may control various units of the digital camera 100, while using the memory 102 as a work memory, according to a program stored in, for example, the non-volatile memory 103. The non-volatile memory 103 may store, for example, image data, audio data, other pieces of data, and various programs used for the CPU 101 to operate. The non-volatile memory 103 may include, for example, a hard disk (HD), a read-only memory (ROM), or the like.

The image processing unit 104 performs various image processing operations on, for example, image data stored in the non-volatile memory 103 or a recording medium 108, image data acquired via the external I/F 109 or the communication I/F 110, and images captured by the imaging unit 112, based on control performed by the CPU 101. The image processing operations which the image processing unit 104 performs include analog-digital (A/D) conversion processing, digital-analog (D/A) conversion processing, and coding processing, compression processing, decode processing, enlargement/reduction processing (resizing), noise reduction processing, and color conversion processing of image data. The image processing unit 104 can be composed of a dedicated circuit block for performing specific image processing. Moreover, depending on types of image processing, instead of the image processing unit 104, the CPU 101 can perform image processing according to a program.

The display 105 displays, for example, an image or a graphical user interface (GUI) screen configuring a GUI, based on control performed by the CPU 101. The CPU 101 generates a display control signal according to a program to control various units of the digital camera 100 in such a way as to generate a video signal to be displayed on the display 105 and output the video signal to the display 105. The display 105 displays a video image based on the output video signal.

The operation unit 106 is an input device for receiving a user operation, which includes, for example, a touch panel, a button, a dial, a joystick, a touch sensor, and a touch pad. For example, operation members included in the operation unit 106 include a shutter button 61, a power button 72, a set button, and a directional button 106c having a touch sensor.

One of members of the operation unit 106 is a touch panel 106a which is capable of detecting contact with the display 105. The touch panel 106a and the display 105 can be configured in an integrated manner. For example, the touch panel 106a is configured to have such a light transmittance as not to hinder displaying performed by the display 105, and is attached to the upper layer of a display surface of the display 105. Then, the input coordinates in the touch panel 106a are associated with the display coordinates on the display 105. With this, a graphical user interface (GUI) can be configured as if the user is allowed to directly operate a screen displayed on the display 105. The CPU 101 is able to detect the following operations performed on the touch panel 106a (the following operations performed on an operation surface of the display 105) or states thereof (touch detection).

Touch-down is a state in which a finger or pen, which has not been touching the touch panel 106a, has newly touched the touch panel 106a, in other words, starting of a touch (hereinafter referred to as "touch-down").

Touch-on is a state in which a finger or pen is touching the touch panel 106a (hereinafter referred to as "touch-on").

Touch-move is a state in which a finger or pen is moving while touching the touch panel 106a (hereinafter referred to as "touch-move").

Touch-up is a state in which a finger or pen, which has been touching the touch panel 106a, has been separated from the touch panel 106a, in other words, ending of a touch (hereinafter referred to as "touch-up").

Touch-off is a state in which none is touching the touch panel 106a (hereinafter referred to as "touch-off").

When touch-down is detected, touch-on is also detected at the same time. After touch-down, unless touch-up is detected, touch-on normally continues being detected. Touch-move is also detected in the state in which touch-on is detected. Even if touch-on is detected, unless the touch position is not moving, touch-move is not detected. After touch-up of all of the fingers or pen touching the touch panel 106a is detected, touch-off is detected.

Information on these operations or states and the coordinates of a position at which a finger or pen is touching the touch panel 106a is transmitted to the CPU 101, and then, the CPU 101 determines how an operation has been performed on the touch panel 106a based on the transmitted information. With regard to touch-move, the CPU 101 is able to also detect the direction of movement of a finger or pen moving on the touch panel 106a for each of a vertical component and a horizontal component on the touch panel 106a based on a change of the position coordinates. Moreover, the operation performed from touch-down to touch-up via predetermined touch-move on the touch panel 106a is referred to as "drawing a stroke". The operation of quickly drawing a stroke is referred to as "flick". The flick is an operation of quickly moving the finger a certain degree of distance while keeping the finger touching the touch panel 106a and then directly separating the finger from the touch panel 106a, in other words, an operation of quickly tracing the surface of the touch panel 106a as if flicking the touch panel 106a with the finger. When touch-move performed a predetermined distance or more at a predetermined speed or higher is detected and touch-up is then detected, it is determined that flick has been performed. Furthermore, when touch-move performed a predetermined distance or more at lower than a predetermined speed is detected, it is determined that drag has been performed. Additionally, a touch operation of concurrently touching a plurality of positions (for example, two points) and then moving the touch positions closer to each other is referred to as "pinch-in", and a touch operation of moving the touch positions away from each other is referred to as "pinch-out". Pinch-out and pinch-in are collectively referred to as a "pinch operation" (or simply as "pinch"). The touch panel 106a can be any type of touch panel selected from among touch panels of various types including, for example, the resistance film type, the capacitance type, the surface acoustic wave type, the infrared ray type, the electromagnetic induction type, the image recognition type, and the optical sensor type. Among these types, there are a type which detects that touch has been performed based on contact with the touch panel and a type which detects that touch has been performed based on access of a finger or pen to the touch panel, but any one of the two types can be employed.

A pressure detection unit 106b, which may be a sensor for detecting the intensity of a touch operation, detects a pressing force applied to a display surface of the display 105 (an operation surface or an operation surface of the touch panel 106a) (pressing detection). The pressure detection unit 106b is able to continuously detect the intensity of a pressing force applied by a touch operation performed on the display 105. The pressure detection unit 106b can have such a configuration that one or a plurality of distortion gage sensors are mounted at a portion which is distorted by a pressing force applied to the operation surface of the display 105 and a pressing force applied to the operation surface of the touch panel 106a is detected based on output values from the distortion gage sensors. Alternatively, a capacitance sensor can be mounted in parallel with the touch panel 106a, and a distance between the finger on the operation surface of the touch panel 106a and the capacitance sensor, which is caused by the operation surface being distorted by a pressing force applied to the operation surface of the display 105, can be calculated based on the capacitance values. Then, the pressure can be calculated based on the calculated distance, or the calculated distance can be treated as being equivalent to a pressure. Furthermore, the pressure detection unit 106b can employ another method as long as it is capable of detecting a pressing force applied to the operation surface of the touch panel 106a. For example, in a case where an operation on the operation surface is performed with use of a stylus, a sensor which is included in the stylus to detect a pressure applied to the tip portion of the stylus can be employed, or the intensity (pressing force) of the touch operation can be detected based on an output from the sensor. Moreover, a sensor which detects the force of touch on the operation surface or an alternative of pressure of touch (for example, the above-mentioned distance between the finger on the operation surface and the capacitance sensor) can be employed. Additionally, various methods and various sensors or a combination of a plurality of sensors (for example, by weighted averaging) can be used to detect the intensity (pressure) of a touch operation. The pressure detection unit 106b can be configured to be integral with the touch panel 106a.

Hereinafter, operating the touch panel 106a with a pressing force smaller than a threshold value Pth is referred to as "weak touch". Moreover, operating the touch panel 106a with a pressing force equal to or larger than the threshold value Pth is referred to as "strong touch".

The directional button 106c having a touch sensor is a physical push button included in the operation unit 106. The directional button 106c allows each of upper, lower, left, and right positions thereof (triangular portions illustrated in FIG. 2) to be pushed in, and, when each position is pushed in, a push-in detection switch mounted at each bottom portion of the directional button 106c is turned on. The push-in detection switch being turned on enables determining which of the upper, lower, left, and right positions has been pressed. Moreover, separately from the push-in detection switches, the directional button 106c is provided with touch sensors for detecting that the finger is touching a portion of the directional button 106c. The touch sensors enable determining which of the positions of the directional button 106c is being touched (which of the upper, lower, left, and right positions is being touched). This enables detecting a state in which the finger is only being placed on the directional button 106c without the directional button 106c being pushed in. Moreover, the touch sensors also enable detecting that a slide operation of the finger in a circumferential direction (a rotating operation) has been performed with the directional button 106c kept touched without being pushed in. This rotating slide operation enables performing control similar to a case where a dial operation member has been rotated, thus functioning as what is called a touch wheel.

The recording medium I/F 107, which allows a recording medium 108, such as a memory card, a compact disc (CD), or a Digital Versatile Disc (DVD), to be loaded thereon, performs read of data from the loaded recording medium 108 or write of data to the loaded recording medium 108 based on control performed by the CPU 101. The external I/F 109 is an interface which is connected to an external apparatus via a wired cable or via wireless and performs inputting and outputting of a video signal or audio signal. The communication I/F 110 is an interface which performs communication with, for example, an external apparatus or the Internet 111 to perform transmission and reception of various pieces of data, such as files or commands.

The imaging unit 112 may be a camera unit which is composed of, for example, an image sensor, such as a charge-coupled device (CCD) sensor or a complementary metal-oxide semiconductor (CMOS) sensor, a zoom lens, a focus lens, a shutter, a diaphragm, a focusing unit, and an A/D converter. The imaging unit 112 is capable of capturing a still image and a moving image, and image data about the captured image is transmitted to the image processing unit 104 to be subjected to various processing operations and is then recorded as a still image file or a moving image file on the recording medium 108.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

In the present exemplary embodiment, the frequency (interval) of what is called key repeat, which periodically performs a predetermined operation in a case where a touch operation is being performed on an operation member, is made less in a case where touch is being performed with the operation member being pressed than in a case where touch is being performed without the operation member being pressed. With this configuration employed, while, in a case where a touch operation is being performed without the operation member being pressed, key repeat is performed at high speed to quickly approach a state aimed at, in a case where touch is being performed with the operation member being pressed, key repeat is performed at reduced speed (the frequency is decreased) to enable accurately determining whether a state aimed at has been reached. In other words, quick and reliable operations are enabled. Hereinafter, this operation is described with time settings in the digital camera 100 taken as an example.

Figure 3:
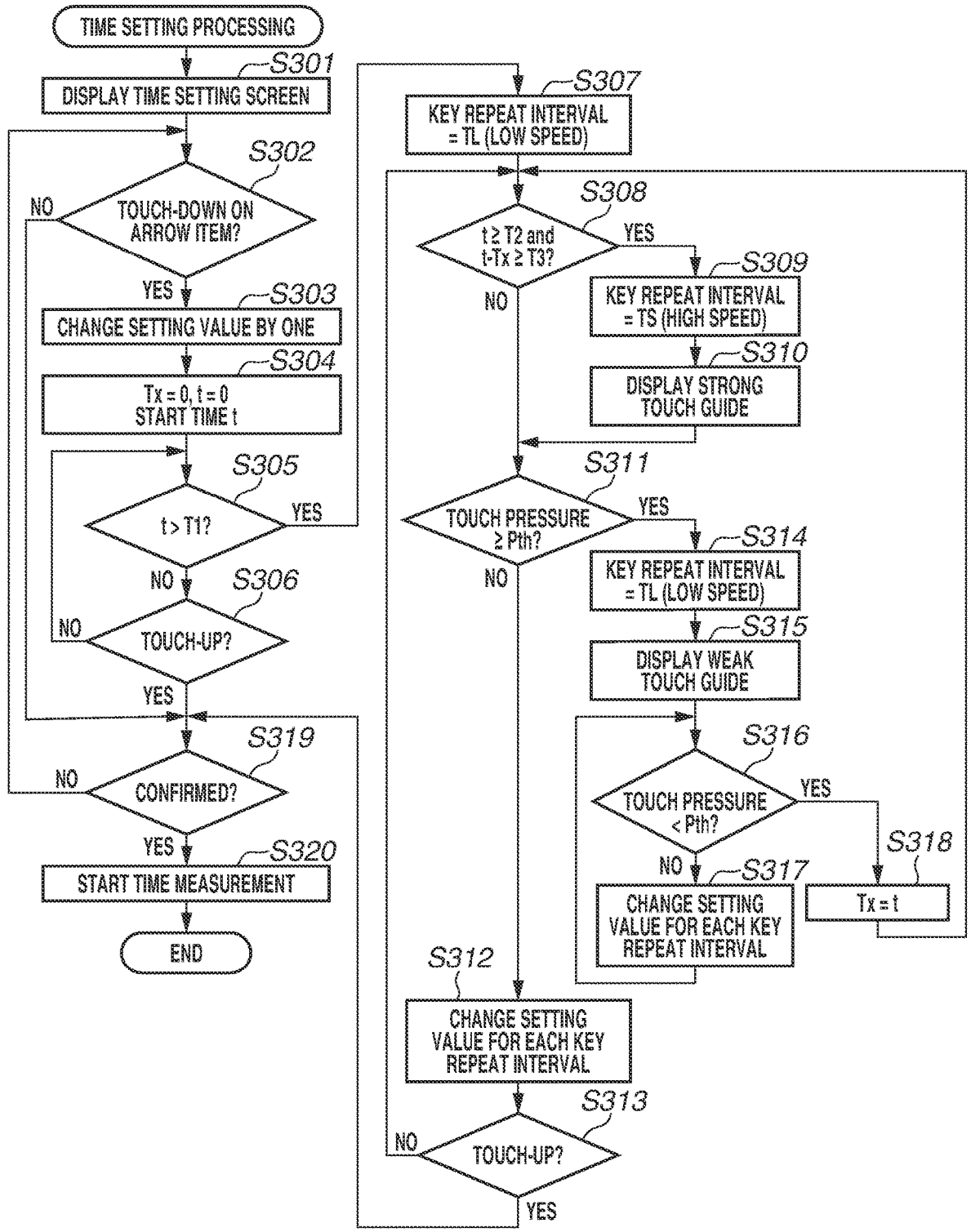
FIG. 3 is a flowchart of time setting processing.

FIG. 3 is a flowchart of time setting processing for changing time setting of the digital camera 100 according to a user operation. This processing is implemented by the CPU 101 reading out a program stored in the non-volatile memory 103 onto the memory 102 serving as a work memory and executing the read-out program. Furthermore, the time setting is setting of time of a clock built in the digital camera 100, and, for example, a captured image is assigned information about the image capturing date and time based on the time set here. When the digital camera 100 is activated and an item of time setting is selected from a setting menu, processing illustrated in FIG. 3 starts.

In step S301, the CPU 101 displays a time setting screen on the display 105.

Figure 4A:
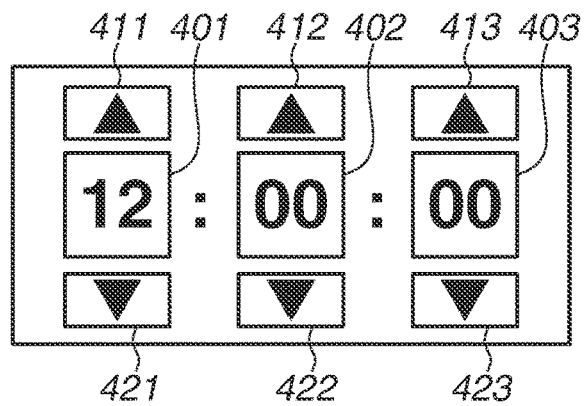
FIGS. 4A, 4B, 4C, and 4D illustrate display examples in the time setting processing.

FIG. 4A illustrates a display example of the time setting screen. As the time setting, hours, minutes, and seconds are settable. Furthermore, dates are also settable, but are omitted from description here. Areas 401 to 403 are display regions indicating the currently set setting values, so that the currently set "hour" (in units of one hour) is set in the area 401, the currently set "minute" is set in the area 402, and the currently set "second" is set in the area 403. In step S301, the CPU 101 displays, as an initial value, the time that is being measured when displaying of the time setting screen has been started (the time obtained before a setting change). Until the time setting screen is ended, the CPU 101 does not update displaying corresponding to the elapse of time. In the example illustrated in FIG. 4A, twelve hours, zero minutes, and zero seconds is displayed as an initial value of the setting value. Arrow items 411 to 413 are touch items used to accept instructions for changing (increasing) the respective setting values of hour, minute, and second. In response to each touch item being touched, the setting value is incremented by one, and, in response to each item being kept touched, a key repeat state is brought about, so that according to a duration time of touch, the setting value is sequentially increased. In other words, according to continuance of touch, an instruction for executing the function of increasing the setting value is continuously performed at a frequency of key repeat. The speed of key repeat varies according to the elapsed time and the pressing force. Details thereof are described below. Arrow items 421 to 423 are touch items used to accept instructions for changing (decreasing) the respective setting values of hour, minute, and second. In response to each touch item being touched, the setting value is decremented by one, and, in response to each item being kept touched, a key repeat state is brought about, so that according to a duration time of touch, the setting value is sequentially decreased. In other words, according to continuance of touch, an instruction for executing the function of decreasing the setting value is continuously performed at a frequency of key repeat. The speed of key repeat varies according to the elapsed time and the pressing force as with the arrow items 411 to 413.

In step S302, the CPU 101 determines whether touch-down has been performed at a position corresponding to any one of the arrow items 411 to 413 and arrow items 421 to 423. If it is determined that touch-down has been performed at a position corresponding to any one of the arrow items 411 to 413 and arrow items 421 to 423 (YES in step S302), the processing proceeds to step S303, and, if not so (NO in step S302), the processing proceeds to step S319.

In step S303, the CPU 101 executes once a command allocated to the touched arrow item. For example, in response to detecting the touch performed on the arrow item 413, which is used to issue an instruction for increasing the number of seconds, the CPU 101 increases the setting value of the number of seconds by one, thus changing displaying of the area 403 from "00" to "01". Moreover, in order to indicate that the touched arrow item is in a state of being touched, the CPU 101 changes a first display form that is taken before touch is performed to a second display form that serves as what is called a button-down display. For example, the CPU 101 changes the color of the touched arrow item to a color different from the color used before touch is performed. The display form to be changed is not limited to color, but can be, for example, enlarging each arrow item, changing the width of a frame or triangular symbol, or applying shadowing or brilliance to the neighborhood of each arrow item.

In step S304, the CPU 101 initializes a variable Tx to "0". The variable Tx is a variable which is used in processing to be described below to measure the elapsed time from when strong touch is switched to weak touch. Moreover, the CPU 101 initializes a timer t to "0", and then starts time measurement. The timer t, the time measurement of which is started here, is a timer for measuring a duration time of touch from when touch-down is performed, and is used to determine whether to make a transition to a key repeat state.

In step S305, the CPU 101 determines whether the timer t has exceeded a threshold value T1. If it is determined that the timer t has exceeded the threshold value T1, in other words, if the duration time of touch from touch-down is performed has exceeded the threshold value T1 (YES in step S305), the processing proceeds to step S307, then making a transition to a key repeat state, and, if not so (NO in step S305), the processing proceeds to step S306.

In step S306, the CPU 101 determines whether touch-up has been performed. If it is determined that touch-up has been performed (YES in step S306), the processing proceeds to step S319, and, if not so (NO in step S306), the processing returns to step S305 for repetition processing.

In step S307, the CPU 101 makes a transition to a key repeat state and sets the key repeat interval (frequency) to TL (low speed, for example, 0.5 seconds). With this, when touch continues and unless a pressing force changes, a key repeat speed in which a command corresponding to the arrow item located at the touch-down position is issued once per TL (the value is changed by one for each TL) becomes 1/TL (for example, two values/second). Furthermore, it is assumed that T1>TL.

In step S308, the CPU 101 determines whether the timer t has become equal to or greater than a threshold value T2 and "t-Tx" has become equal to or greater than a threshold value T3. The threshold value T2 is greater than the threshold value T1 (T2>T1). Tx is a variable to which "t", which is an elapsed time at a point of time when strong touch to be described below is released and a weak touch state is brought about, is assigned in step S317 to be described below. Thus, "t-Tx" indicates an elapsed time from when strong touch is released and a weak touch state is brought about to the current time. The threshold value T3 is, for example, about one second, and is assumed to be greater than a key repeat interval TS (high speed) to be described below and to be less than the threshold value T2 (TS<T3<T2). In a case where a determination in this step is first performed before strong touch is performed, since Tx=0, t-Tx=t holds, and, if t≥T2, "t-Tx" is necessarily in excess of the threshold value T3. If it is determined that the duration time t of touch from touch-down is performed has reached the threshold value T2 and "t-Tx≥T3" is satisfied (the duration time from when strong touch is switched to weak touch has reached the threshold value T3 or switching to strong touch has not been performed) (YES in step S308), the processing proceeds to step S309. If not so (NO in step S308), the processing proceeds to step S311.

In step S309, the CPU 101 sets the key repeat interval (frequency) to TS (high speed, for example, 0.25 seconds). Thus, (T2>T1) TL>Ts. With this, when touch continues and unless a pressing force changes, a key repeat speed in which a command corresponding to the arrow item located at the touch-down position is issued once per TS (the value is changed by one for each TS) becomes 1/TS (for example, four values/second).

Figure 4B:
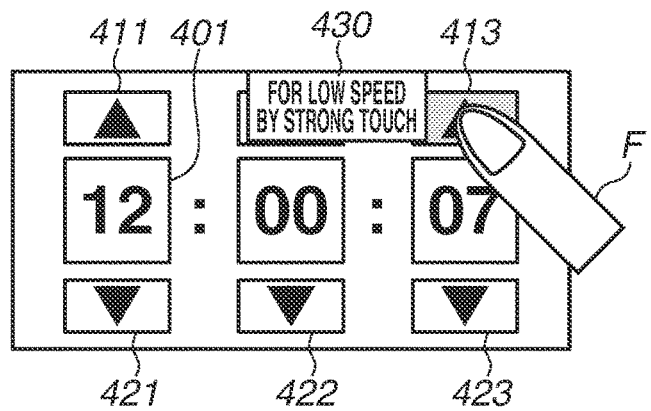

In step S310, the CPU 101 displays a strong touch guide for guiding the user to information indicating that performing strong touch enables lengthening the key repeat interval (decreasing the key repeat speed). FIG. 4B illustrates a display example of the strong touch guide. In the present exemplary embodiment, performing strong touch, in which touch is performed with a strong pressure, enables decreasing the speed of key repeat (switching from high speed to low speed). Displaying the strong touch guide 430 enables the user to recognize such an operation method. The strong touch guide 430 automatically disappears (is hidden) according to the elapse of a predetermined time (for example, one second). Moreover, the display form of an arrow item which is being touched with the finger F (in the example illustrated in FIG. 4B, the arrow item 413) can be set to a third display form different from the display format employed in a case where the key repeat interval is TL (for example, a color different from the color of another display format). This enables the user to recognize that the key repeat interval is in a state of being set to TS. Furthermore, the display form can be set to what is called a button-down display indicating that touch is being performed and strong touch is not detected, so that the above-mentioned second display form can be maintained.

In step S311, the CPU 101 determines whether the pressure detection unit 106*b* has detected a pressure by a touch operation equal to or greater than a threshold value Pth, in other words, whether strong touch has been performed. If it is determined that the pressure detection unit 106*b* has detected a pressure by a touch operation equal to or greater than the threshold value Pth (strong touch has been performed) (YES in step S311), the processing proceeds to step S314, and, if not so (NO in step S311), the processing proceeds to step S312.

In step S312, the CPU 101 makes a change to the value corresponding to an arrow item located at the touch position once for each set key repeat interval. For example, in a case where touch-down has been detected with respect to the arrow item 413, the CPU 101 increases the setting value of the number of seconds by one for each set key repeat interval.

In step S313, the CPU 101 determines whether touch-up has been performed. If it is determined that touch-up has been performed (YES in step S313), the processing proceeds to step S319, and, if not so (NO in step S313), the processing returns to step S308 for repetitive processing.

In step S314, the CPU 101 sets the key repeat interval to TL (low speed, for example, 0.5 seconds). With this, in response to a pressing operation being performed during the process of execution of key repeat at the key repeat interval TS (high speed), the key repeat interval is changed to TL (low speed), so that the speed of key repeat is decreased.

Figure 4C:
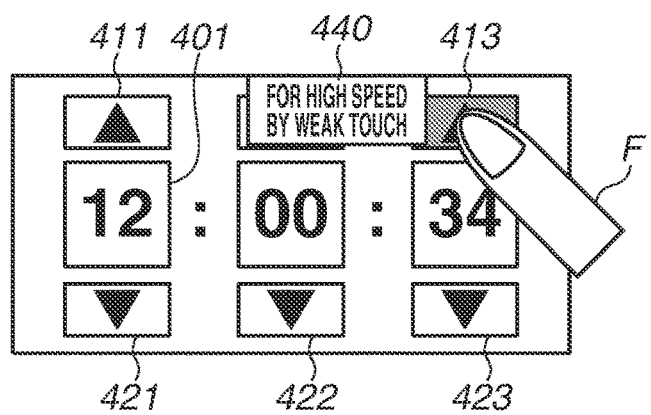

In step S315, the CPU 101 displays a weak touch guide for guiding the user to information indicating that weakening a pressure by a touch operation to switch from strong touch to weak touch enables shortening the key repeat interval (increasing the key repeat speed). FIG. 4C illustrates a display example of the weak touch guide. In the present exemplary embodiment, performing weak touch, in which touch is performed with a weak pressure, enables increasing the speed of key repeat (switching from low speed to high speed). Displaying the weak touch guide 440 enables the user to recognize such an operation method. The weak touch guide 440 automatically disappears (is hidden) according to the elapse of a predetermined time (for example, one second). Moreover, the display form of an arrow item which is being touched (in the example illustrated in FIG. 4C, the arrow item 413) can be set to a fourth display form different from the display format employed in a case where weak touch has been performed (for example, a color different from the colors of the first to third display formats). This enables the user to recognize that strong touch is being accepted. In other words, this enables the user to recognize that the key repeat interval becoming TL to decrease the key repeat speed has been caused by strong touch being performed.

In step S316, the CPU 101 determines, via the pressure detection unit 106b, whether the pressure by a touch operation has become less than the threshold value Pth, in other words, whether the state of a weak touch operation has been brought about. If it is determined that the pressure by a touch operation has become less than the threshold value Pth (the weak touch state has been brought about) (YES in step S316), the processing proceeds to step S318, and, if not so (NO in step S316), the processing proceeds to step S317. Furthermore, hysteresis can be provided between a threshold value used to determine whether a weak touch state has been switched to a strong touch state and a threshold value used to determine whether a strong touch state has been switched to a weak touch state. More specifically, the determination in step S316 can be changed to a determination as to whether the pressure by a touch operation has become less than a threshold value Pth' (<Pth), and, if the result of determination is true, the CPU 101 can determine that a weak touch state has been brought about. Moreover, processing for removing chattering can be performed, so that, in a case where the state in which the pressure falls below a threshold value has continued for a some amount of time, the CPU 101 can determine that a weak touch state has been brought about.

In step S317, the CPU 101 makes a change to the value corresponding to an arrow item located at the touch position once for each set key repeat interval. Here, since the touch operation is in a strong touch state, the key repeat interval is currently set to TL (low speed). For example, in a case where touch-down has been detected with respect to the arrow item 413, the CPU 101 increases the setting value of the number of seconds of time setting by one for each period TL. Then, the processing returns to step S316. In this way, as long as the touch operation is in a strong touch state, even if the strong touch state is continued, the key repeat speed does not change and remains a low speed.

In step S318, the CPU 101 assigns "t", which is the elapsed time from touch-down to the current time, to the variable Tx stored in the memory 102. Then, the processing proceeds to step S308, in which the CPU 101 determines whether "t-Tx" has reached the threshold value T3, in other words, whether "T3", which is a predetermined time, has elapsed from when the strong touch state has been switched to the weak touch state. Unless the result of this determination becomes true, the key repeat interval does not become TS (high speed). In other words, in a case where the weak touch state has been brought about by the pressure being weakened (by releasing the strong touch state) with a touch kept continued, the key repeat speed is prevented from being immediately increased. This enables preventing such a phenomenon that, when the user moves the finger away after confirming that an intended setting value has been reached during the process of strong touch, a high-speed key repeat may be performed due to intervention of a weak touch state so that an intended value would be passed over. Moreover, in a case where "t-Tx" has reached the threshold value T3, in other words, the threshold value T3 has elapsed from when the strong touch state has been switched to the weak touch state, a high-speed key repeat is re-performed. Since the threshold value T3 is shorter than the threshold value T2, in a case where the user wants to switch the key repeat interval from a low speed to a high speed during the process of strong touch, only weakening the touch pressure with a touch kept continued is able to bring about a high-speed key repeat state more quickly than once releasing a touch and re-performing a touch.

In step S319, the CPU 101 determines whether a confirmation operation of time setting has been performed. If it is determined that no confirmation operation has been performed (NO in step S319), the processing returns to step S302, in which the CPU 101 determines whether there is touch-down. If it is determined that the confirmation operation has been performed (YES in step S319), the processing proceeds to step S320, in which the CPU 101 finalizes setting of time with the adjusted setting value of time setting and starts time measurement with that time, then ending the time setting processing.

With reference to the timing chart of FIG. 5, an operation performed in the above-described time setting processing and the timing of issuance of a key command performed by key repeat (a command corresponding to the touched arrow item) are described. Here, a case is described where, while aiming to change the setting time of seconds from "00" to "34", the user has touched the arrow item 413 (a touch item used to issue an instruction for increasing the number of seconds of time).

Suppose that, at time t0, touch-down with weak touch has been performed on the arrow item 413 in a state in which the setting time of seconds is "00" as illustrated in FIG. 4A (YES in step S302). In this case, at the instant of touch-down, a command is issued once, so that the setting time of seconds becomes "01" (step S303). After that, even when a touch is continued, no command is issued before the threshold value T1 elapses, so that the setting time of seconds is not changed.

When, at time t1, the duration time of weak touch has reached the threshold value T1 (YES in step S305), the key repeat state is brought about (step S307), and the command is issued once for each key repeat interval TL (step S312), so that the setting time of seconds increases. Until time t2 is reached, the command is issued five times, so that the setting time of seconds increases by 5, thus becoming "06".

At time t2, the duration time of touch reaches the threshold value T2 without strong touch being performed (YES in step S308), so that the key repeat interval becomes TS (high speed) (step S309). On this occasion, as illustrated in FIG. 4B, the strong touch guide 430 is displayed. In this state, since the frequency of switching of the setting time of seconds is high, the setting time of seconds aimed at can be quickly approached. On the other hand, the user may be unable to accurately recognize the current setting time of seconds in a visible manner. In that case, the user is allowed to perform strong touch to decrease the key repeat speed, thus making the current setting time of seconds easily viewable.

At time t3, the user performs strong touch (YES in step S311), so that the interval of key repeat becomes TL (low speed) (step S314). This enables the user to visually recognize to where the setting time of seconds has been changed. The user can see that, from time t3, the setting time of seconds is being sequentially switched to "14", "15", "16", and "17", but, since "34" aimed at is still far, the user attempts to decrease the touch pressure to bring about a high-speed key repeat state again.

At time t4, the user weakens the touch pressure (YES in step S316), thus bringing about a weak touch state. Since, at that point, the period T3 has not yet elapsed from when strong touch is changed to weak touch, the interval of key repeat is not yet changed to a high-speed interval.

At time t5, the period T3 has elapsed from when the touch pressure is weakened (YES in step S308), so that the key repeat interval becomes TS (high speed) again (step S309). Here, the period from when the touch pressure is weakened at time t4 to when the key repeat interval becomes TS (high speed) at time t5 is the period T3, which is considerably shorter than the period T2 from the start of touch to when the key repeat interval becomes TS (high speed). Thus, the user is enabled to bring about a high-speed key repeat state more quickly than bring about a key repeat state by once releasing a touch, confirming a setting value, and then re-performing a touch. The user can increase the setting time of seconds by performing some key repeat at the key repeat interval TS (high speed).

Figure 4D:
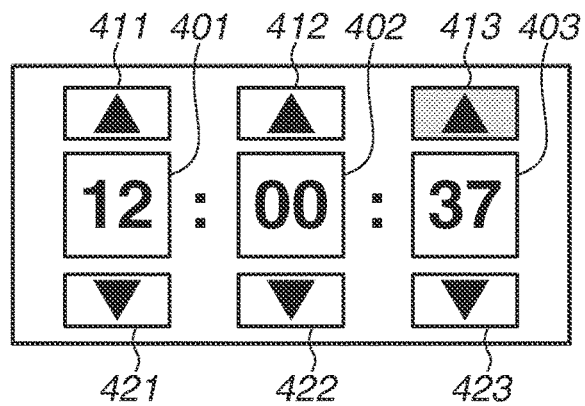

At time t6, the user increases the touch pressure again to bring about a strong touch state (YES in step S311), thus decreasing the key repeat speed to confirm the current setting time of seconds (step S314). Then, the user sees that the current setting time of seconds has been changed to "30", which is close to an intended value, therefore, still continues strong touch, and then releases a touch when the current setting time of seconds has reached "34" aimed at (YES in step S316 and YES in step S313). At this time, since the key repeat speed is not immediately changed to high speed even when the touch pressure is weakened, the intended "34" is unlikely to be erroneously passed over before the touch is released. More specifically, since the user can perform an operation in such a manner that, after the result of determination in step S316 becomes YES, the result of determination in step S313 becomes YES before the first key repeat at low speed occurs, changing of the setting value in step S312 to be performed between those steps is not performed. In this way, according to the present exemplary embodiment, the setting value can be set to an intended value quickly and accurately. If high-speed key repeat would be performed through intervention of a weak touch state when the user confirms that the setting value has become an intended value during the process of strong touch and then moves the finger away, the intended value may be passed over. FIG. 4D illustrates a display example in a case where the setting value has passed over the intended "34" and then has become "37". According to the present exemplary embodiment, the possibility of causing such an event can be reduced.

Furthermore, as one of the features, the user can perform an operation without ever releasing a touch in a period from when touch-down is performed at time t0 to time t7. Since the user can quickly and accurately set the setting value without releasing a touch, when the user holds the digital camera 100 with one hand and performs a touch operation with a finger of the hand used for holding, the user does not need to disengage the hand from the digital camera 100, so that the possibility of erroneously dropping the digital camera 100 can be reduced. Moreover, as long as the user can confirm that the user has touched an intended item at the time of touch-down, if the user is able to confirm the current setting value by receiving a feedback (for example, sound) other than displaying on the display 105, the user does not need to see the screen any more. Accordingly, there is also such an advantageous effect that the user can change the setting value without much seeing the screen while viewing the condition of an object the image of which the user intends to capture after performing time setting.

In the above-described exemplary embodiment, changing the pressure of touch is used to decrease the speed of switching of the setting value (to lower the execution frequency of switching of the setting value). This is directed to a case where the alignment sequence of available choices is known as in time setting (numerical values) and, when an available choice (target choice) to be determined comes close, strong touch is performed to decrease the switching speed, thus facilitating determination. However, in the case of available choices the sequence of which is unforeseeable, even if the user performs strong touch or cancels an operation after visually confirming that the target choice has been displayed on the display 105 halfway through high-speed switching of available choices, the target choice may be passed over. Therefore, in the case of switching of such available choices the sequence of which is indeterminate, when strong touch is performed halfway during high-speed switching of available choices, not only the speed of switching becomes low speed, but also the available choices can be switched in an order reverse to the order obtained before strong touch is performed. Moreover, strong touch can be divided into two or more stages, and, if a touch pressure equal to or higher than a threshold value Pth is detected, the key repeat speed can be decreased without changing of the switching order. Then, if a touch pressure equal to or higher than a threshold value Pth2 (>Pth), which is a higher pressure, is detected, not only the key repeat speed is decreased, but also the order of switching of available choices can be set to the reverse sequence.

While, in the above-described exemplary embodiment, an example in which the present disclosure is applied to a touch panel has been described, the exemplary embodiment is not limited to this. The exemplary embodiment can be applied to any operation member capable of detecting a touch operation and a pressing operation on an operation surface. For example, the present disclosure can be applied to a directional button 106c having a touch sensor. In the case of a time setting screen, the right and left keys of the directional button 106c can be used to select a setting item to be changed, among hours, minutes, and seconds, and a touch or pressing operation on the up or down key thereof can be used to change the value of the setting item (an operation on the up key causes an increase and an operation on the down key causes a decrease). On this occasion, if an operation performed with "second" selected as a setting item to be changed is treated in the following manner, control similar to the processing described with reference to FIG. 3 can be performed. A touch having no pressing on the up position (the position of the up key) of the directional button 106c (a state in which pushing-in is not detected by the push-in detection switch at the up position) is treated as similar to the above-mentioned weak touch on the arrow item 413. Moreover, pressing on the up position (the position of the up key) of the directional button 106c (a state in which pushing-in is detected by the push-in detection switch at the up position) is treated as similar to the above-mentioned strong touch on the arrow item 413.

More specifically, a touch on the up key being detected causes the setting value to increase by one, the touch being continued without being pushed in brings about a key repeat state, and the touch being further continued sets the key repeat to high speed. Then, pushing-in of the up key being detected sets the key repeat to low speed, and neither pushing-in nor touch at the position of the up key becoming detected (the finger being moved away from the up key) stops the key repeat. In this way, the present disclosure can be applied to an operation member capable of detecting a touch operation and a pressing operation. Furthermore, while, in the above-mentioned example, the key repeat interval employed when key repeat is started without strong touch being performed and the key repeat interval employed when strong touch is performed are set to the same TL, those do not need to be the same. Strong touch being performed only needs to make the interval of key repeat longer (make the speed of key repeat lower) than that obtained before strong touch is performed.

While, in the above-described exemplary embodiment, an example in which the present disclosure is applied to key repeat during time setting has been described, the exemplary embodiment is not limited to this. The present disclosure can be applied to another command as long as the command is capable of performing key repeat. For example, the present disclosure can be applied to a command for image forward. In a playback mode, an image or a plurality of images recorded on the recording medium 108 is displayed on the display 105. In that state, an image forward icon used to issue an instruction for image forward and an image backward icon for issuing an instruction for image backward are displayed. In response to a touch (weak touch) on the image forward icon or a touch at the right position of the directional button 106c, an image or a row of images displayed on the display 105 is switched according to the file number sequence (image forward is performed once). The touch being continued in that state brings about a key repeat state, so that the image forward is performed one after another. In response to pressing (strong touch on the touch panel 106a or pressing at the right position of the directional button 106c) being performed in a state in which key repeat has been set to high speed (during the process of execution of image forward), the key repeat interval is increased, so that the speed of image forward is decreased. In this way, examples of the function that is executed by key repeat to which the present disclosure can be applied include changing of the time setting of seconds and the image forward. Besides, the examples include the setting of sound volume (the setting of a moving image, music, or operation sound), the setting of display brightness of the display 105, and the movement of an item to be selected from among a list of items. Naturally, the examples are not limited to these.

MODIFICATION EXAMPLE 1

Figure 6A:
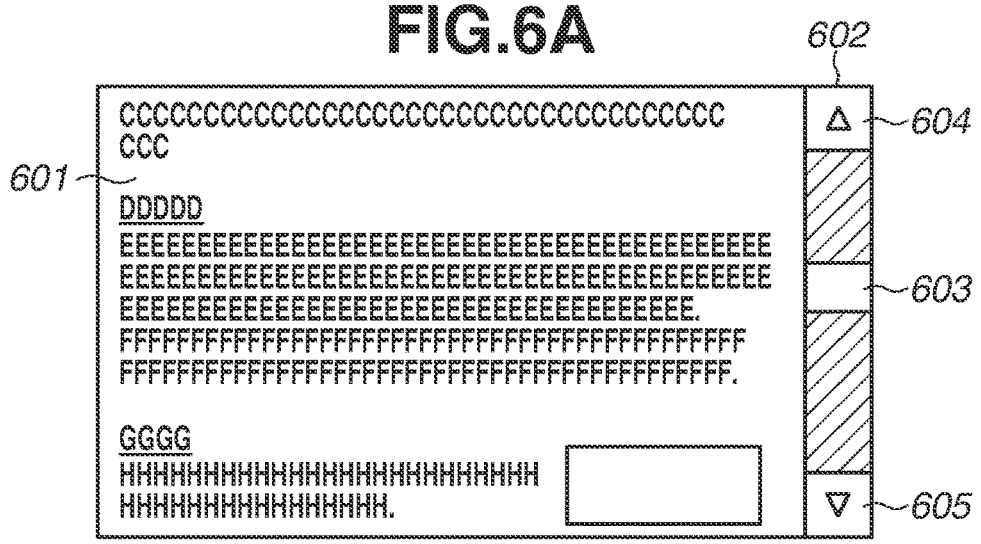
FIG. 6A illustrates a display example of an object display screen which is capable of accepting a scrolling operation.

While, in the above-described exemplary embodiment, an example in which the present disclosure is applied to key repeat has been described, the present disclosure can be applied to not only the key repeat but also any function which is continuously performed in conjunction with the continuation of a touch operation. For example, the present disclosure can be applied to a scrolling function which changes a display range. FIG. 6A illustrates a display example of an object display screen which is capable of accepting a scrolling operation on the display 105. A display object 601 is a display target, such as a web page, a part of the entirety of which is displayed on the display 105. The user performs a scrolling operation in such a way as to cause an intended position of the web page to be displayed. A knob 600 displayed on a scroll bar 602 indicates which portion of the entire web page is set as a display range. An arrow item 604 is a touch item used to accept an instruction for scrolling in such a manner that an upper portion of the display object 601 is displayed (for scrolling in such a manner that the display object 601 moves downward, in other words, for down scrolling). An arrow item 605 is a touch item used to accept an instruction for scrolling in such a manner that a lower portion of the display object 601 is displayed (for scrolling in such a manner that the display object 601 moves upward, in other words, for up scrolling). The present disclosure can be applied to a touch operation and a pressing operation on the arrow items 604 and 605.

In this case, the above-described processing illustrated in FIG. 3 can be applied by performing correspondence treatment in the following way. Displaying of a viewing screen for a display object is treated as a corresponding alternative of displaying of the time setting screen, and scrolling is treated as a corresponding alternative of changing of the setting value. Moreover, the scrolling speed as low speed (for example, 20 mm/second) is treated as a corresponding alternative of the key repeat interval TL (low speed), and the scrolling speed as high speed (for example, 40 mm/second) is treated as a corresponding alternative of the key repeat interval TS (high speed). More specifically, in a state in which the screen illustrated in FIG. 6A is displayed, when touch-down on the arrow item 604 is detected (YES in step S302), the display object is scrolled down by a predetermined amount (for example, 10 mm) (step S303). When the duration time of the continued touch has become equal to or larger than the threshold value T1, continuous scrolling downward at low speed (20 mm/second) is performed (steps S307 to S313). When the duration time of the touch further elapses (YES in step S308), the scrolling speed is set to high speed (40 mm/second) (step S309), so that continuous scrolling at high speed is performed. When, in this state, strong touch is performed such that the touch pressure becomes equal to or greater than the threshold value Pth (YES in step S311), the scrolling speed is decreased to low speed (step S314). With this operation performed, performing strong touch halfway through the process of scrolling at high speed enables decreasing the scrolling speed, thus facilitating confirmation of the display content of the display object. Then, when confirming that scrolling is completed to an intended position, the user can release the touch to stop scrolling (YES in step S316 and YES in step S313). On this occasion, since the scrolling speed is not immediately increased at a point of time when the touch pressure has become weak before the touch is released (if the threshold value T3 is not reached in step S308, the processing does not proceed to step S309), such an event that, when the touch is released, scrolling is unconsciously advanced too much can also be prevented. While a web page is taken as an example of the display object, naturally, the display object is not limited to this.

The present modification example can be applied to any operation capable of performing a scrolling operation, such as scrolling of an image (scrolling of a plurality of images or scrolling for changing of the display range of an image displayed in an enlarged manner), scrolling of an item list screen, or scrolling of a document, such as an e-mail or text. Furthermore, changing of the scrolling speed can also be implemented with use of key repeat. For example, the above-mentioned displaying of the time setting screen described with reference to FIG. 3 can be replaced by displaying of a scrolling target, and changing of the setting value performed once can be replaced by scrolling processing by 5 mm performed by key repeat once. With this operation employed, increasing the scrolling speed by the continuation of weak touch and decreasing the scrolling speed according to strong touch can also be implemented.

MODIFICATION EXAMPLE 2

Figure 6B:
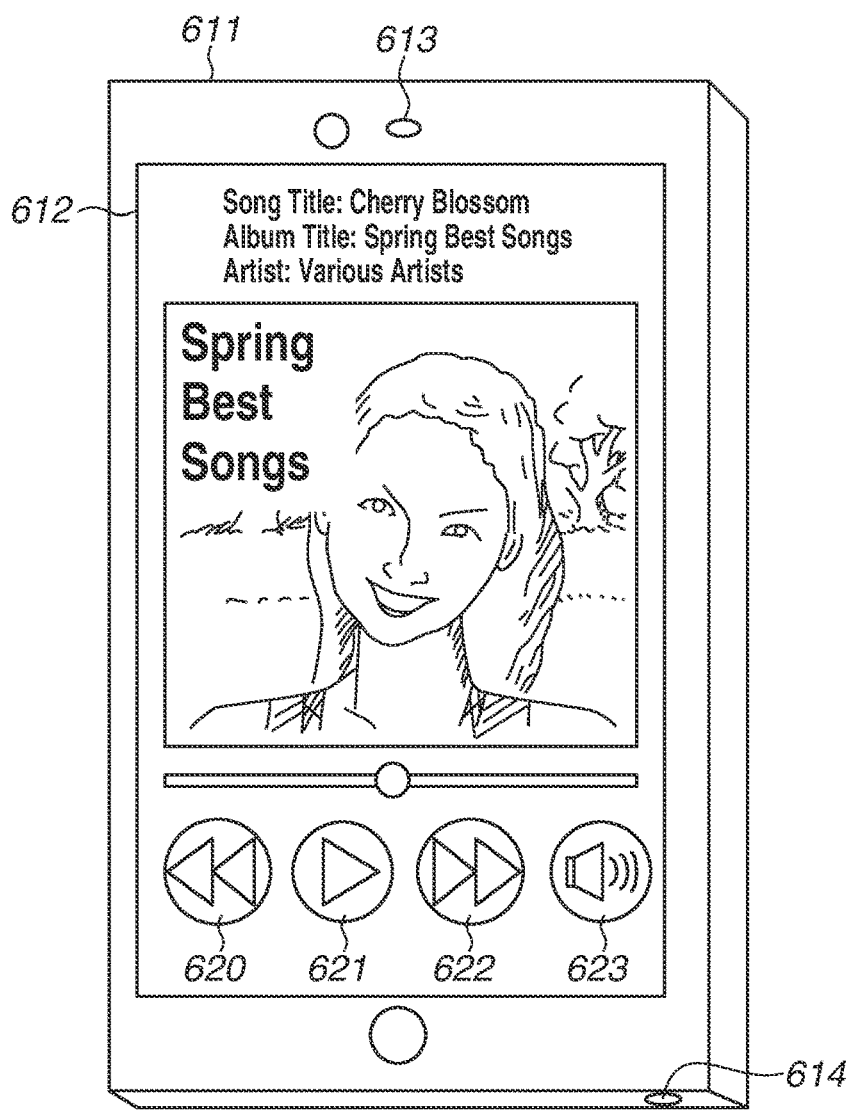
FIG. 6B illustrates a display example of a music playback screen.

The present disclosure can also be applied to any function which is continuously performed in conjunction with the continuation of a touch operation, for example, the function of changing a playback position of time-series data, such as a moving image or music (sound). FIG. 6B illustrates an example in which a music playback screen is displayed on a display 612 of a smartphone 611 (a music player or a moving image player). A speaker 613 is a speaker (a sound output unit or a sound generation unit) which performs audio output during playback of music and outputs talk sound during a phone call. An earphone jack 614 is an audio output terminal from which an audio signal is output to an external device, such as an earphone, during playback of music. The display 612, which serves as a touch panel, is capable of detecting a touch operation on a display surface (operation surface) as with the above-mentioned display 105 of the digital camera 100. Moreover, the display 612 is also capable of detecting the pressure of a touch operation on the display surface (operation surface) thereof. A display item 621 is a playback icon used to accept an instruction for starting playback of a selected music file. A display item 620 is a back icon used to accept an instruction for bringing the playback position of a selected music file back to a previous position. A display item 622 is a forward icon used to accept an instruction for moving the playback position of a selected music file forward. A display item 623 is a sound volume setting icon used to accept an instruction for changing the volume of sound.

In this case, the above-described processing illustrated in FIG. 3 can be applied by performing correspondence treatment in the following way. Displaying of a music playback screen is treated as a corresponding alternative of displaying of the time setting screen, and changing of the playback position is treated as a corresponding alternative of changing of the setting value. Moreover, the changing speed of the playback position as low speed (for example, the twofold speed of normal playback) is treated as a corresponding alternative of the key repeat interval TL (low speed), and the changing speed of the playback position as high speed (for example, the tenfold speed of normal playback) is treated as a corresponding alternative of the key repeat interval TS (high speed). More specifically, in a state in which the screen illustrated in FIG. 6B is displayed, when touch-down on the display item 622 is detected (YES in step S302), the playback position is moved forward by a predetermined amount (for example, an amount corresponding to one second). Furthermore, here, the playback position can be configured not to be changed or changing to low speed can be configured to be performed.

When the duration time of the continued touch has become equal to or larger than the threshold value T1, as long as the touch is continued, the playback position is moved forward at low speed (twofold speed), so that high-speed playback at the twofold speed is performed (steps S307 to S313). When the duration time of the touch further elapses (YES in step S308), the changing speed of the playback position is set to high speed (tenfold speed) (step S309), so that high-speed playback at the tenfold speed is performed. When, in this state, strong touch is performed such that the touch pressure becomes equal to or greater than the threshold value Pth (YES in step S311), the playback speed is decreased to the twofold speed serving as low speed (step S314). With this operation performed, performing strong touch halfway through the process of playback at high speed enables decreasing the playback speed, thus facilitating confirmation of the advancement of the playback position. Then, when confirming that the playback position has been moved to an intended position, the user can release the touch to stop changing of the playback position (YES in step S316 and YES in step S313). On this occasion, since the changing speed of the playback position is not immediately increased at a point of time when the touch pressure has become weak before the touch is released (if the threshold value T3 is not reached in step S308, the processing does not proceed to step S309), such an event that, when the touch is released, the playback position is unconsciously changed too much can also be prevented. The present modification example can be similarly applied to changing of the playback position of a moving image. Furthermore, while an example in which the present modification example is applied to the smartphone 611 has been described, even the digital camera 100 is able to perform capturing of a moving image, playback of a moving image, and playback of sound, so that the present modification example can be similarly applied to the digital camera 100.

Furthermore, in both the modification examples 1 and 2, in response to the touch pressure equal to or greater than the threshold value Pth being detected, the speed of the function can be decreased, and, in response to the touch pressure becoming the higher threshold value Pth2 (>Pth), the direction of the function can be set to a reverse direction (reverse scrolling or reversal of the direction of changing of the playback position).

Moreover, with regard to scrolling and the movement of the playback position, processing in step S318 and the determination in step S308 as to whether t-T≥T3 can be omitted. In other words, when the touch pressure is weakened, the execution speed of the function can be immediately changed to high speed.

Furthermore, while, in each of the above-described exemplary embodiments, an example in which, in response to the touch pressure increasing, the execution frequency or speed of a function is decreased has been described, depending on stages of the touch pressure, in response to the touch pressure increasing, the execution frequency or speed of the function can be increased. For example, with respect to the above-mentioned threshold value Pth, threshold values in such a relationship as Pth2<Pth3<Pth are provided, and the execution frequency or speed of a function in a case where the detected pressure P is in such a relationship as Pth2≤P<Pth3 is made higher than in a case where the detected pressure P is lower than the threshold value Pth2. Then, the execution frequency or speed of the function in a case where Pth3≤P<Pth is made higher than in a case where Pth2≤P<Pth3. Then, the execution frequency or speed of the function in a case where Pth≤P is made lower than in a case where Pth3≤P<Pth. In this way, before the touch pressure exceeds the threshold value Pth, increasing the touch pressure enables increasing the execution frequency or speed of the function according to an increase of the touch pressure, and stronger pushing-in enables decreasing the execution frequency or speed of the function.

Furthermore, the above-described various control operations, which have been described as being performed by the CPU 101, can be performed by a single piece of hardware or can be shared by a plurality of pieces of hardware to perform processing to control the entire apparatus.

Moreover, while the present disclosure has been described based on desirable exemplary embodiments, the present disclosure is in no way limited to the specific exemplary embodiments, and various configurations within a range that does not depart from the gist of the present disclosure are also included in the present disclosure. Moreover, each of the above-described exemplary embodiments is merely an exemplary embodiment of the present disclosure, and some or all of the exemplary embodiments can be combined as appropriate.

Moreover, while, in the above-described exemplary embodiment, an example in which the present disclosure is applied to the digital camera 100 has been described, the exemplary embodiment is not limited to this, but can be applied to any electronic apparatus capable of detecting a touch operation and a pressure operation on an operation surface. More specifically, the present disclosure can be applied to a personal computer, a personal digital assistant (PDA), a portable telephone terminal, and a portable image viewer. Moreover, the present disclosure can be applied to, for example, a printer apparatus, a digital photo frame, a music player, a gaming machine, an electronic book reader, a tablet terminal, a smartphone, a projection apparatus, a home electric apparatus, and an on-board apparatus.

According to exemplary embodiments of the present disclosure, a result of execution of a predetermined function intended by the user can be more quickly and accurately obtained.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-128042, filed Jun. 29, 2017, which is hereby incorporated by reference herein in its entirety.

What is claimed is:

1. An electronic apparatus comprising:
  a touch detector configured to detect a touch operation performed on an operation surface;
  a pressing detector configured to detect a pressing operation performed on the operation surface; and
  a memory and at least one processor which function as a control unit configured to perform control
    to continuously perform a predetermined function according to continuation of the touch operation on the operation surface detected by the touch detector,
    to decrease a speed or execution frequency of the predetermined function according to the pressing operation being detected by the pressing detector with the touch operation on the operation surface kept continued, and
    not to increase the speed or execution frequency of the predetermined function for a predetermined period even when a state of the pressing operation being detected by the pressing detector is changed to a state of the pressing operation not being detected with the touch operation on the operation surface kept continued,
    to repeatedly perform the predetermined function at a first frequency according to continuation of the touch operation on the operation surface in the state of the pressing operation not being detected by the pressing detector, and
    to repeatedly perform the predetermined function at a second frequency lower than the first frequency according to continuation of the pressing operation after the pressing operation is detected by the pressing detector with the touch operation kept continued,
wherein the predetermined period is longer than an interval of execution of the predetermined function in the second frequency.

2. The electronic apparatus according to claim 1, wherein the control unit performs control to increase the speed or execution frequency of the predetermined function when the predetermined period has elapsed from when the state of the pressing operation being detected by the pressing detector has been changed to the state of the pressing operation not being detected with the touch operation on the operation surface kept continued.

3. The electronic apparatus according to claim 1, wherein the control unit increases the speed or execution frequency of the predetermined function according to a duration time of the touch operation on the operation surface in the state of the pressing operation not being detected by the pressing detector reaching a predetermined time.

4. The electronic apparatus according to claim 1, wherein the predetermined function is at least one of a function of increasing a setting value, a function of decreasing a setting value, and switching of displayed images.

5. The electronic apparatus according to claim 1, wherein the control unit performs control
to perform key repeat of an execution instruction of the predetermined function at a first frequency according to continuation of the touch operation on the operation surface in the state of the pressing operation not being detected by the pressing detector, and
to perform key repeat of an execution instruction of the predetermined function at a second frequency lower than the first frequency according to continuation of the pressing operation after the pressing operation is detected by the pressing detector with the touch operation kept continued.

6. The electronic apparatus according to claim 1, wherein the control unit performs control
to repeatedly perform the predetermined function at a first speed according to continuation of the touch operation on the operation surface in the state of the pressing operation not being detected by the pressing detector, and
to perform the predetermined function at a second speed lower than the first speed according to continuation of the pressing operation after the pressing operation is detected by the pressing detector with the touch operation kept continued.

7. The electronic apparatus according to claim 1, wherein the predetermined function is scrolling that changes a display range of a display target displayed on a display unit.

8. The electronic apparatus according to claim 1, wherein the predetermined function is playback of sound or a moving image.

9. The electronic apparatus according to claim 1, wherein, during execution of a function according to continuation of the touch operation on the operation surface in the state of the pressing operation not being detected by the pressing detector, the control unit performs control to display a guide indicating that a speed or frequency of the function being executed is able to be decreased by increasing a pressing force.

10. The electronic apparatus according to claim 1, wherein, during execution of a function according to continuation of the touch operation on the operation surface in the state of the pressing operation being detected by the pressing detector, when a pressing force is further increased, the control unit performs control to perform the function in a reverse direction.

11. The electronic apparatus according to claim 1,
wherein the touch detector is a touch panel configured to detect a touch operation performed on a display surface of a display unit serving as an operation surface, and
wherein the pressing detector detects a pressing operation performed on the display surface of the display unit.

12. The electronic apparatus according to claim 1,
wherein the touch detector is a touch sensor configured to detect a touch performed on an operation surface of a physical push button, and
wherein the pressing detector detects pressing of the push button.

13. The electronic apparatus according to claim 1, wherein the control unit terminates the continuously performing the predetermined function when release of the touch is detected by the touch detector.

14. A control method for an electronic apparatus, the control method comprising:
detecting a touch operation performed on an operation surface;
detecting a pressing operation performed on the operation surface; and
performing control
to continuously perform a predetermined function according to continuation of the detected touch operation on the operation surface,
to decrease a speed or execution frequency of the predetermined function according to the pressing operation being detected with the touch operation on the operation surface kept continued, and
not to increase the speed or execution frequency of the predetermined function for a predetermined period even when a state of the pressing operation being detected is changed to a state of the pressing operation not being detected with the touch operation on the operation surface kept continued,
to repeatedly perform the predetermined function at a first frequency according to continuation of the touch operation on the operation surface in the state of the pressing operation not being detected by the pressing detector, and
to repeatedly perform the predetermined function at a second frequency lower than the first frequency according to continuation of the pressing operation after the pressing operation with the touch operation kept continued,
wherein the predetermined period is longer than an interval of execution of the predetermined function in the second frequency.

15. A non-transitory computer-readable storage medium storing computer-executable instructions that, when executed by a computer, cause the computer to perform a method for controlling an electronic apparatus, the method comprising:
detecting a touch operation performed on an operation surface;
detecting a pressing operation performed on the operation surface; and
performing control
to continuously perform a predetermined function according to continuation of the detected touch operation on the operation surface,
to decrease a speed or execution frequency of the predetermined function according to the pressing operation being detected with the touch operation on the operation surface kept continued, and not to increase the speed or execution frequency of the predetermined function for a predetermined period even when a state of the pressing operation being detected is changed to a state of the pressing operation not being detected with the touch operation on the operation surface kept continued, to repeatedly perform the predetermined function at a first frequency according to continuation of the touch operation on the operation surface in the state of the pressing operation not being detected, and to repeatedly perform the predetermined function at a second frequency lower than the first frequency according to continuation of the pressing operation after the pressing operation is detected with the touch operation kept continued, wherein the predetermined period is longer than an interval of execution of the predetermined function in the second frequency.

16. An electronic apparatus comprising:

a touch detector configured to detect a touch operation performed on an operation surface;

a pressing detector configured to detect a pressing operation performed on the operation surface; and a memory and at least one processor which function as a control unit configured to perform control to continuously perform a predetermined function according to continuation of the touch operation on the operation surface detected by the touch detector, to decrease a speed or execution frequency of the predetermined function according to the pressing operation being detected by the pressing detector with the touch operation on the operation surface kept continued, and not to increase the speed or execution frequency of the predetermined function for a predetermined period even when a state of the pressing operation being detected by the pressing detector is changed to a state of the pressing operation not being detected with the touch operation on the operation surface kept continued, wherein, during execution of a function according to continuation of the touch operation on the operation surface in the state of the pressing operation being detected by the pressing detector, the control unit performs control to display a guide indicating that a speed or frequency of the function being executed is able to be increased by decreasing a pressing force, and the guide automatically disappears according to an elapse of a predetermined time.

17. A control method for an electronic apparatus, the control method comprising:

detecting a touch operation performed on an operation surface;

detecting a pressing operation performed on the operation surface; and performing control to continuously perform a predetermined function according to continuation of the touch operation on the operation surface detected by the touch detector, to decrease a speed or execution frequency of the predetermined function according to the pressing operation being detected by the pressing detector with the touch operation on the operation surface kept continued, and not to increase the speed or execution frequency of the predetermined function for a predetermined period even when a state of the pressing operation being detected is changed to a state of the pressing operation not being detected with the touch operation on the operation surface kept continued, wherein, during execution of a function according to continuation of the touch operation on the operation surface in the state of the pressing operation being detected, performing control to display a guide indicating that a speed or frequency of the function being executed is able to be increased by decreasing a pressing force, and the guide automatically disappears according to an elapse of a predetermined time.

18. A non-transitory computer-readable storage medium storing computer-executable instructions that, when executed by a computer, cause the computer to perform a method for controlling an electronic apparatus, the method comprising:

detecting a touch operation performed on an operation surface;

detecting a pressing operation performed on the operation surface; and perform control to continuously perform a predetermined function according to continuation of the touch operation on the operation surface detected by the touch detector, to decrease a speed or execution frequency of the predetermined function according to the pressing operation being detected by the pressing detector with the touch operation on the operation surface kept continued, and not to increase the speed or execution frequency of the predetermined function for a predetermined period even when a state of the pressing operation being detected is changed to a state of the pressing operation not being detected with the touch operation on the operation surface kept continued, wherein, during execution of a function according to continuation of the touch operation on the operation surface in the state of the pressing operation being detected, performing control to display a guide indicating that a speed or frequency of the function being executed is able to be increased by decreasing a pressing force, and the guide automatically disappears according to an elapse of a predetermined time.

* * * * *